United States Patent
Takasaka et al.

(10) Patent No.: US 7,715,725 B2
(45) Date of Patent: May 11, 2010

(54) LOCK DETECTOR AND OPTICAL PHASE-LOCKED LOOP SYSTEM

(75) Inventors: Shigehiro Takasaka, Chiyoda-ku (JP); Yasuyuki Ozeki, Ichihara (JP)

(73) Assignees: Japan Science and Technology Agency, Kawaguchi-shi (JP); The Furukawa Electric Co., Ltd., Tokyo (JP)

( * ) Notice: Subject to any disclaimer, the term of this patent is extended or adjusted under 35 U.S.C. 154(b) by 553 days.

(21) Appl. No.: 11/577,128

(22) PCT Filed: Oct. 12, 2005

(86) PCT No.: PCT/JP2005/018806

§ 371 (c)(1), (2), (4) Date: Apr. 12, 2007

(87) PCT Pub. No.: WO2006/041103

PCT Pub. Date: Apr. 20, 2006

(65) Prior Publication Data

US 2008/0272850 A1 Nov. 6, 2008

(30) Foreign Application Priority Data

Oct. 12, 2004 (JP) ............................. 2004-297910

(51) Int. Cl.
*H04B 10/00* (2006.01)
*H04J 14/02* (2006.01)
(52) U.S. Cl. .................................. 398/154; 398/82
(58) Field of Classification Search .............. 398/154, 398/150, 195, 200, 201, 43, 82, 39
See application file for complete search history.

(56) References Cited

U.S. PATENT DOCUMENTS 5,574,588 A * 11/1996 Kawanishi et al. .......... 398/201

(Continued)

FOREIGN PATENT DOCUMENTS

EP 1 531 355 A1 5/2005

(Continued)

OTHER PUBLICATIONS

Reza Salem, et al., "Broad-Band Optical Clock Recovery System Using Two-Photon Absorption", IEEE Phonics Technology Letters, vol. 16, No. 9, Sep. 2004, pp. 2141-2143.

(Continued)

*Primary Examiner*—M. R. Sedighian
(74) *Attorney, Agent, or Firm*—Oblon, Spivak, McClelland, Maier & Neustadt, L.L.P.

(57) ABSTRACT

A lock detection apparatus detecting lock of an optical phase-locked loop apparatus including a first phase detector comparing phases of an input light signal and a beat light signal to output a first phase comparison signal, a loop filter forming the first phase comparison signal, and an optical voltage controlled oscillator outputting the beat light signal based on the formed first phase comparison signal. The lock detection apparatus includes: a phase shifter shifting the phase of the beat light signal; and a second phase detector comparing the phases of the input light signal and the phase-shifted beat light signal to output a second phase comparison signal, wherein the phase shifter shifts a quantity of the phase so that the phase comparison signal may not be 0 when the phases of the two light signals compared by the second phase detector synchronize with each other to the beat light signal.

32 Claims, 16 Drawing Sheets

U.S. PATENT DOCUMENTS 6,915,081 B2 * 7/2005 Takeshita et al. ............ 398/188
7,054,403 B2 * 5/2006 Nosaka et al. .............. 375/376

FOREIGN PATENT DOCUMENTS

JP     1-126631     5/1989
JP     8-288902     11/1996
WO     WO 03/104886     12/2003

OTHER PUBLICATIONS

Takashi Yano, et al., "Hikari PLL Clock Chushutsu Hoshiki O MMochiita Hikari TDM20GB/S-105KM Denso Jikken", The Institute of Electronics, Information and Communication Engineers, Mar. 10, 1994, pp. 4-445-4-446, and a cover page.

* cited by examiner

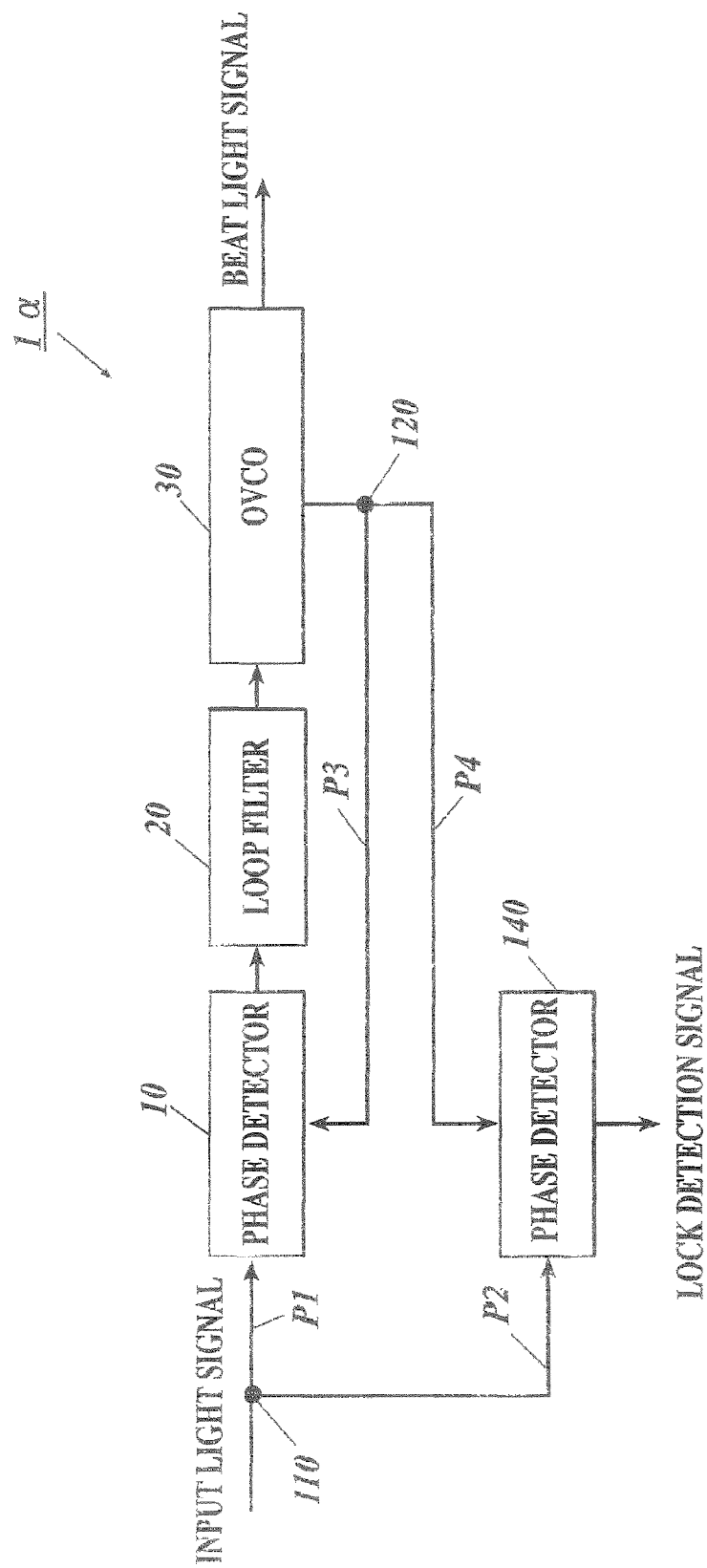

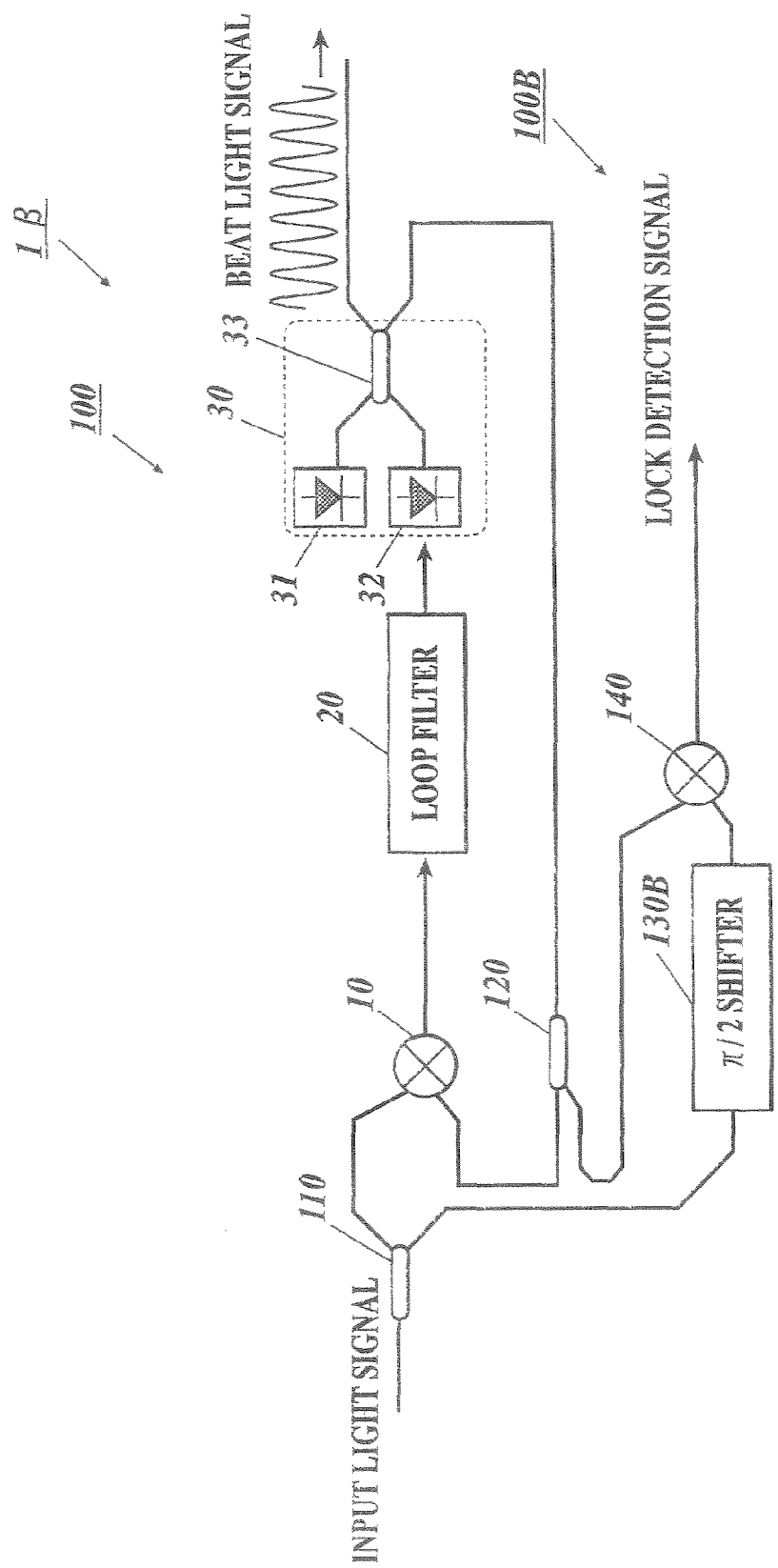

LOCK DETECTOR AND OPTICAL PHASE-LOCKED LOOP SYSTEM

TECHNICAL FIELD

The present invention relates to a lock detection apparatus and an optical phase-locked loop system.

BACKGROUND ART

There has been a phase-locked loop (PLL) apparatus outputting an electric signal having a phase synchronized with a reference electric signal. When an output frequency is a high frequency, a phase-locked loop apparatus 200 of an analog PLL as shown in FIG. 18. The phase-locked loop apparatus 200 is configured to include a signal source 210, an electric mixer 220 as a phase detector, a loop filter 230, a voltage controlled oscillator (VCO) 240 and a pre-scaler 250.

The operations of the electric mixer 220 as a phase comparator are shown in FIG. 19. As shown in FIG. 19, the electric mixer 220 outputs a product of an input electric signal as a reference signal from the signal source 210 and the output electric signal which has been output from the VCO 240 and has been subjected to frequency dividing by the pre-scaler 250. Consequently, the difference frequency and the sum frequency of the two signals are output in the frequency domain. Because the difference frequency component reflects the phase difference between the phases of the two signals, the electric mixer 220 is able to operate as the phase comparator by extracting only the difference frequency with the loop filter 230. The loop filter 230 outputs a positive signal, 0 signal and a negative signal when the phase difference between the input electric signal and the output signal of the VCO 240 is 0 degree, 90 degrees and 180 degrees, respectively, and the signal continuously changes according to the phase difference.

In this manner, the analog PLL performs the negative feedback control of the VCO so that the output signal of the phase comparator becomes 0, and the output phase of the VCO synchronizes with the phase of the input electric signal in the state of being shifted by 90 degrees consequently. However, the phase-locked loop apparatus which outputs a signal of a frequency of 100 GHz or more has the following difficult points:

1. it is difficult to manufacture the electric mixer for a signal of 100 GHz or more, and
2. it is difficult to manufacture the VCO capable of outputting an electric signal of 100 GHz or more.

Consequently, the phase-locked loop apparatus outputting an electric signal of 100 GHz or more is difficult to manufacture.

On the other hand, there is an optical phase-locked loop apparatus as a phase-locked loop apparatus capable of outputting a signal of 100 GHz or more (see, for example, Patent Document 1) Now, an example of the optical phase-locked loop apparatus will be described, referring to FIG. 20.

As shown in FIG. 20, an optical phase-cocked loop apparatus 300 is configured to include three elements of a phase detector composed of a multiplexer 310 and a phase comparator 320, a loop filter 330 and an optical voltage controlled oscillator (OVCO) 340. The optical phase-locked loop apparatus 300 receives a light signal as an input signal, and outputs a beat light signal synchronizing with the input signal from the OVCO 340.

The OPLL 340 is composed of laser diodes (LD's) 341 and 342, and an optical coupler 343. The OVCO 340 multiplexes the output lights of the two LD's 341 and 342 having output light wavelengths different from each other with the optical coupler 343. The polarizations of the optical outputs of the LD's 341 and 342 are made to be the same hereupon As a result, the two optical outputs interfere with each other in the optical coupler 343, and the optical coupler 343 outputs a beat light oscillating at a frequency according to the difference between the wavelengths. The restriction of the wavelength difference is determined by the band of the optical coupler 343. Because an ordinary optical coupler has a band of 10 THz or more, the ordinary optical coupler is able to easily output a beat light oscillating at a frequency of 100 GHz or more. Moreover, the LD's 341 and 342 are able to change the output wavelength thereof according to a drive current and a controlled temperature. Consequently, the OVCO 340 is able to control the output wavelengths of the LD's 341 and 342 according to an input light signal, and is able to change the frequency of the beat light signal to be output.

The phase comparator 320 outputs an electric signal according to the phase difference between the light intensities of two input signals using a nonlinear effect such as two-photon absorption, second harmonic wave generation, four-wave mixing, Kerr effect or the like. There are an avalanche photodiode (APD) a photon multiplier tube (PMT) and the like as the devices performing the two-photon absorption; there are a nonlinear crystal, a periodical poled lithium niobate ($LiNbO_3$) crystal (PPLN) and the like as the second harmonic wave generation devices; there are a highly nonlinear fiber, a semiconductor optical amplifier (SOA) and the like as the four-wave mixing devices; and there is a nonlinear optical loop mirror (NOLM) as a method of using the Kerr effect. A nonlinear phenomenon happens in a short time less than several hundreds fs, and has a frequency band of 10 THz or more. Consequently, phase comparison is able to be performed to the signals of 100 GHz or more.

For example, a Si-APD has little sensitivity to the light of the wavelength of 1550 nm, however, has certain sensitivity to the light of the wavelength shorter than 800 nm. Consequently, any photoelectric currents are hardly generated when the light of 1550 nm enters the Si-APD, however, the Si-APD has certain sensitivity to the two-photon absorption phenomenon of 1550 nm. By installing an optical system so as to have the focus thereof on the surface of the Si-APD, the probability of the occurrence of the two-photon absorption becomes larger, and a photoelectric current that is exceptionally larger in comparison with the case of radiating light on the whole Si-APD is generated. The photoelectric current generated by the two-photon absorption in the Si-APD has a tear in proportion to the cosine of the mutual phase difference $\phi$ ($\cos \phi$) between two input lights. The sum of a steady-state value that is determined by optical power regardless of the phase difference $\phi$ and the part caused by the contribution of the cosine $\cos \phi$ is output as the photoelectric current generated by the two-photon absorption. The contribution of the cosine $\cos \phi$ is able to be extracted as the difference between an output photoelectric current and an average photoelectric current, and is able to be used as a phase comparison signal.

The loop filter 330 forms the phase comparison signal and outputs a control signal of the OVCO 340, as it is used in an ordinary phase-locked loop apparatus.

The operation of optical phase-locked loop apparatus 300 as the optical phase-locked loop apparatus is similar to that of the analog phase-locked loop apparatus of FIG. 18 except that the OVCO 340 outputs a beat light signal, and except that the optical coupler 310 and the phase comparator 320 uses the nonlinear effect to perform the phase comparison between an input light signal and the beat light signal. By the optical phase-locked loop apparatus 300, the signal generation in which a beat light synchronized with an input light signal, which beat light is 100 GHz or more, is able to be output becomes possible.

Moreover, an electric phase-locked loop apparatus the electric phase comparator of which is replaced with an optical phase comparator using the two-photon absorption in a Si-APD was also considered (see, for example, Non-patent Document 1). In Un-patent Document 1, an electric signal synchronized with the light signal of 12.5 Gbits/s is output.

[Patent Document 1] International Publication Pamphlet No. 03/104886

[Non-patent Document 1] Reza Salem, T. E. Murphy "Broad-Band Optical Clock Recovery System Using Two-photon Absorption", IEEE Photon. Technol. Lett., vol. 9, pp. 2141-2143, Sep. 2004.

DISCLOSURE OF THE INVENTION

Problem to be Solved by the Invention

However, the conventional optical phase-locked loop apparatus operates as an optical phase-locked loop apparatus as shown in Patent Document 1, but the conventional optical phase-locked loop apparatus is not able to detect whether an input light signal and a beat light signal synchronize with each other or not because the conventional optical phase-locked loop apparatus does not have any lock detection mechanisms.

Moreover, because the configuration of replacing the electric phase comparator in the conventional electric phase-locked loop apparatus with the optical phase comparator using two-photon absorption in a Si-APD uses an electric VCO, it is difficult to output a signal of the frequency of 100 GHz or more by the configuration.

It is an object of the present invention to detect the lock of an input light signal with a beat light signal in an optical phase-locked loop apparatus outputting a beat light signal synchronized with an input light signal.

Means to Solve the Problem

In order to solve the above-described problem, in accordance with the first aspect of the invention, the lock detection apparatus detecting lock of an optical phase-locked loop apparatus includes a first phase detector comparing phases of an input light signal and a beat light signal to output a first phase comparison signal, a loop filter forming the first phase comparison signal, and an optical voltage controlled oscillator outputting the beat light signal based on the formed first phase comparison signal, the lock detection apparatus comprises:

a phase shifter shifting the phase of the beat light signal; and a second phase detector comparing the phases of the input light signal and the phase-shifted beat light signal to output a second phase comparison signal, wherein the phase shifter shifts a quantity of the phase to the beat light signal so that the phase comparison signal does not become 0 when the phases of the two light signals compared by the second phase detector synchronize with each other.

In accordance with the second aspect of the invention, the lock detection apparatus detecting lock of an optical phase-locked loop apparatus includes a first phase detector comparing phases of an input light signal and a beat light signal to output a first phase comparison signal, a loop filter forming the first phase comparison signal, and an optical voltage controlled oscillator outputting the beat light signal based on the formed first phase comparison signal, the lock detection apparatus comprises:

a phase shifter shifting the phase of the input light signal; and a second phase detector comparing the phases of the beat light signal and the phase-shifted input light signal to output a second phase comparison signal, wherein the phase shifter shifts a quantity of the phase so that the phase comparison signal may not be 0 when the phases of the two light signals compared by the second phase detector synchronize with each other to the input light signal.

In the lock detection apparatus according to the first or the second aspect of the invention, the phase shifter may shift the phase of the beat light signal based on a difference of optical path lengths.

In the lock detection apparatus according to the first or the second aspect of the invention, at least one of the first and the second phase detectors may include a multiplexing unit multiplexing the input light signal and the beat light signal, and a phase comparison unit outputting a phase comparison signal according to a phase difference between the input light signal and the beat light signal by a nonlinear effect using the multiplexed light signal.

In the lock detection apparatus according to the first or the second aspect of the invention, the phase comparison unit may be a Si-APD.

In the case of the lock detection apparatus according to the first or the second aspect of the invention, the Si-APD may be provided with an ant-reflective coat corresponding to a wavelength of the input light signal.

In the lock detection apparatus according to the first or the second aspect of the invention, the apparatus may further include an optical isolator at a preceding stage of the phase comparison unit.

In the lock detection apparatus according to the first or the second aspect of the invention, the phase comparison unit may be a photomultiplier tube.

In the lock detection apparatus according to the first or second aspect of the invention, the phase comparison unit may include a second harmonic wave generation crystal, and a light receiving unit receiving a light output from the second harmonic wave generation crystal to output a phase comparison signal.

In the lock detection apparatus according to the first or the second aspect of the invention, the phase comparison unit may include a periodical poled $LiNbO_3$ crystal, and a light receiving unit receiving a light output from the periodical poled $LiNbO_3$ crystal to output a phase comparison signal.

In the lock detection apparatus according to the first or the second aspect of the inventions the phase comparison unit may include a highly nonlinear fiber, and a light receiving unit receiving a light newly produced from the highly nonlinear fiber to output a phase comparison signal.

The invention may be an optical phase-locked loop system including: the lock detection apparatus according to the first or the second aspect of the Invention, and the above-described optical phase-locked loop apparatus.

In accordance with the third aspect of the invention, the optical phase-locked loop system comprises:

an optical phase-locked loop apparatus including a first phase detector comparing phases of an input light signal and a beat light signal to output a first phase comparison signal, a loop filter forming the first phase comparison signal, and an optical voltage controlled oscillator outputting the beat light signal based on the formed first phase comparison signal, wherein the optical voltage controlled oscillator includes: a first and a second light sources each outputting a light signal having a mutually different frequency; a phase shifter adjusting the light signals output from the first and the second light sources by a wavelength plate to shift a phase of a light beat signal output from the optical voltage controlled oscillator; and a beam splitter multiplexing the adjusted light signals to separate the multiplexed light signal into a first and a second beam light signals, and the first phase detector compares phases of the input light signal and the first beat light signal to output the first phase comparison signal, and the system further comprises a second phase detector comparing phases of the input light signal and the second beat light signal to output a second phase comparison signal, wherein the phase shifter adjusts a quantity to the two light signals output from the first and the second light sources so that the phase comparison signal does not become 0 when the phases of the two light signals compared by the second phase detector synchronize with each other.

In the optical phase-locked loop system according to the third aspect of the invention, the phase shifter includes a $\lambda/2$ wavelength plate through which an output signal of the first light source transmits, and a $\lambda/4$ wavelength plate through which an output signal of the second light source transmits; and the beam splitter multiplexes a light signal transmitted through the $\lambda/2$ wavelength plate and a light signal transmitted through the $\lambda/4$ wavelength plates and separates the multiplexed light signal into a first beat light signal and a second beat light signal having a phase shifted from the first beat light signal by 90 degrees.

In the optical phase-locked loop system according to the third aspect of the invention, at least one of the first and the second phase detectors comprises: a multiplexing unit multiplexing the input light signal and the beat light signal; and a phase comparison unit outputting a phase comparison signal corresponding to a phase difference between the input light signal and the beat light signal according to a nonlinear effect by using the multiplexed light signal.

In this case of the optical phase-locked loop system according to the third aspect of the inventions the phase comparison unit may be a Si-APD.

In the optical phase-locked loop system according to the third aspect of the invention, the Si-APD may be provided with an antireflective coat corresponding to a wavelength of the input light signal.

In the optical phase-locked loop system according to the third aspect of the invention, an optical isolator may be provided at a preceding stage of the phase comparison unit.

In the optical phase-locked loop system according to the third aspect of the invention, the phase comparison unit may be a photomultiplier tube.

In the optical phase-locked loop system according to the third aspect of the invention, the phase comparison unit may comprise a second harmonic wave generation crystal, and a light receiving unit receiving a light output from the second harmonic wave generation crystal to output a phase comparison signal.

In the optical phase-locked loop system according to the third aspect of the invention, the phase comparison unit may comprise a periodical poled $LiNbO_3$ crystal, and a light receiving unit receiving a light output from the periodical poled $LiNbO_3$ crystal to output a phase comparison signal.

In the optical phase-locked loop system according to the third aspect of the invention, the phase comparison unit may comprise a highly nonlinear fiber, and a light receiving unit receiving a light of a newly produced wavelength from the highly nonlinear fiber to output a phase comparison signal.

Effect of the Invention

According to the first aspect of the invention, when the phases of the two light signals to be compared in the second phase detector are synchronized with each other, the phase shifter performs the phase shift of the beat light signal by the quantity by which the phase comparison signal does not become 0, and the second phase detector outputs the second phase comparison signal of the input light signal with the phase-shifted beat light signal. Consequently, the lock of the optical phase-locked loop apparatus can be detected based on the second phase comparison signal.

According to the second aspect of the invention, when the phases of the two light signals to be compared in the second phase detector are synchronized with each other, the phase shifter performs the phase shift of the input light signal by the quantity by which the phase comparison signal does not become 0, and the second phase detector outputs the second phase comparison signal of the beat light signal with the phase-shifted input light signal. Consequently, the lock of the optical phase-locked loop apparatus can be detected based on the second phase comparison signal.

According to the third aspect of the invention, when the phases of the two light signals to be compared in the second phase detector are synchronized with each other, the optical voltage controlled oscillator adjusts the light signal by the quantity by which the phase comparison signal does not become 0 with the wavelength plate, and generates the first and the second beat light signals based on the adjusted two light signals, and further the second phase detector outputs the second phase comparison signal of the phases of the input light signal and the second beat light signal. Consequently, the lock of the optical phase-locked loop apparatus can be detected based on the second phase comparison signal regardless of the changes of the frequency of the input light signal.

BRIEF DESCRIPTION OF DRAWINGS

[FIG. 4A] This is a diagram showing a configuration of a variable optical delay unit 130a.

[FIG. 5] This is a diagram showing each optical path length in the optical phase-locked loop system 1α.

[FIG. 8] This is a diagram showing the configuration of an optical phase-locked loop system 1β of a second embodiment of the present invention.

BEST MODE FOR CARRYING OUT THE INVENTION

In the following, a first and a second embodiments according to the present invention and a first and a second modified examples will be described in order, referring to the attached drawings.

First Embodiment

Figure 1:
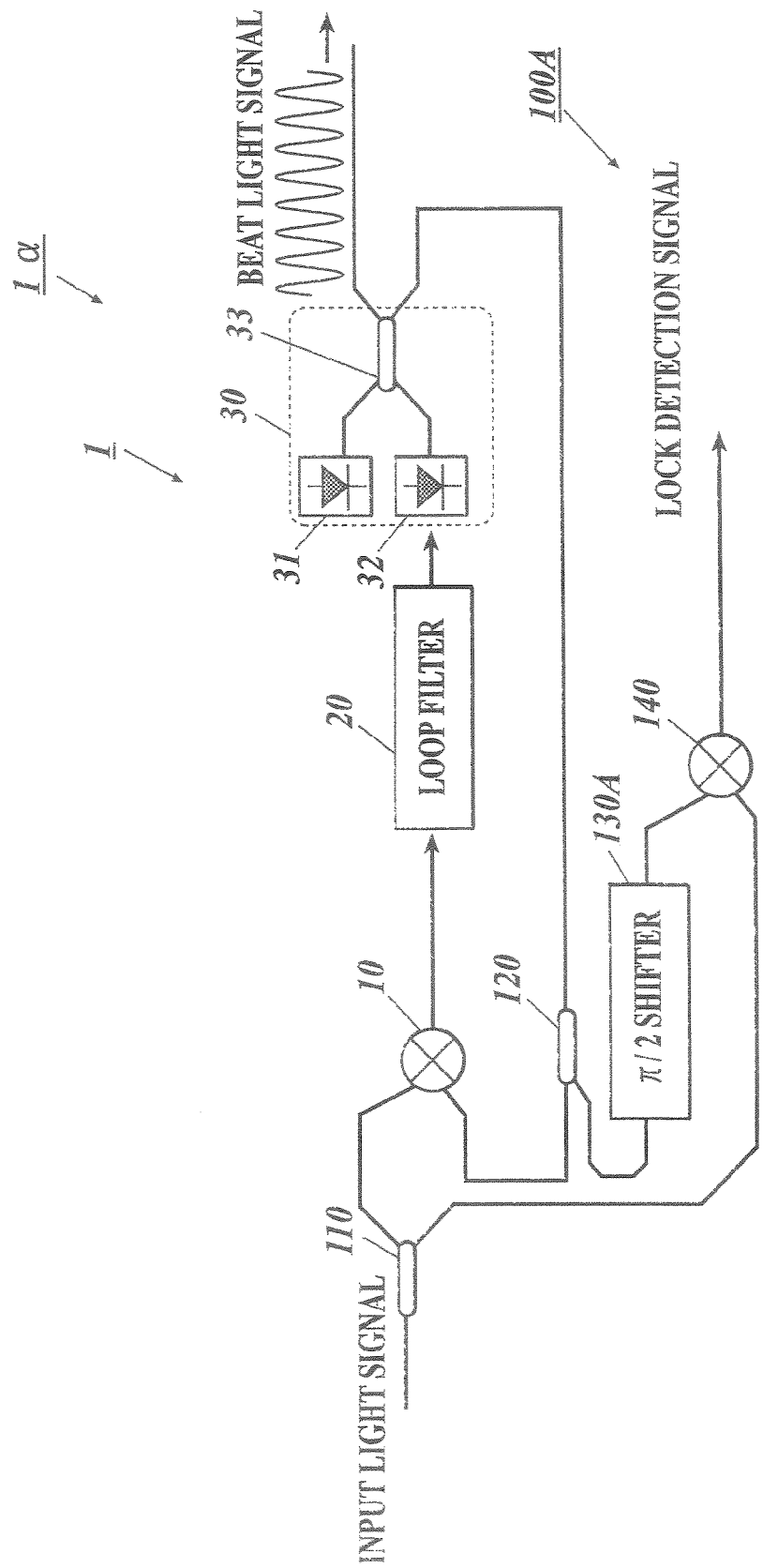
[FIG. 1] This is a diagram showing a configuration of the optical phase-locked loop system 1α of a first embodiment according to the present invention.

A first embodiment according to the present invention is described, referring to FIGS. 1-7. First, the apparatus configuration of an optical phase-locked loop system 1α of the present embodiment is described, referring to FIGS. 1-5. FIG. 1 shows the configuration of the optical phase-locked loop system 1α of the present embodiment. As shown n FIG. 1, the optical phase-locked loop system 1α includes an optical phase-locked loop apparatus 1 and a lock detection apparatus 100A detecting lock by comparing the phases of an input light signal and a beat light signal of the optical phase-locked loop apparatus 1

The phase-locked loop apparatus 1 is configured to include a phase detector 10, a loop filter 20 and an OVCO 30. The OVCO 30 is provided with LD's 31 and 32 and an optical coupler 33. The lock detection apparatus 100A is provided with a demultiplexer 110, a demultiplexer 120, a λ/2 shifter 130A and a phase detector 140.

The demultiplexer 110 demultiplexes an input light signal into two light signals of the same phase, and is configured of, for example, an optical coupler. The phase detector 10 compares the phases of the input two light signals, and outputs a phase comparison signal as the comparison result. The loop filter 20 forms the phase comparison signal of the phase detector 10 to output the formed phase comparison signal. The OVCO 30 outputs a beat light signal based on the phase comparison signal output from the loop filter 20.

In the OVCO 30, the LD's 31 and 32 output two light signals each having a mutually different frequency, and the two light signals are multiplexed by the optical coupler 33. A beat light signal according to the frequency difference is demultiplexed into two beat light signals to be output. The polarization plane of each output light of the LD's 31 and 32 is made to be the same. One beat light signal between the two beat light signals output from the optical coupler 33 is output as an output, and the other beat light signal is demultiplexed into two beat light signals by the demultiplexer 120. One beat light signal between the demultiplexed two beat light signals is again input into the phase detector 10. That is, the phase detector 10 compares the phases of the input light signal demultiplexed by the demultiplexer 110 and the beat light signal demultiplexed by the demultiplexer 120 to form a loop. The phase difference between the input light signal and the beat light signal is controlled to become 90 degrees.

The λ/2 shifter 130A shifts the phase of the other beat light signal demultiplexed by the demultiplexer 120 by λ/2 to output the shifted beat light signal. The phase detector 140 compares the phases of the light signal the phase of which has been shifted by λ/2 by the λ/2 shifter 130A and the input light signal demultiplexed by the demultiplexer 110 to output a phase difference comparison signal as the comparison result as a lock detection signal. The mutual polarization planes of the light signal input into the phase detector 140, the phase of which signal has been shifted by λ/2, and the input light signal are previously set to agree with each other.

Figure 2:
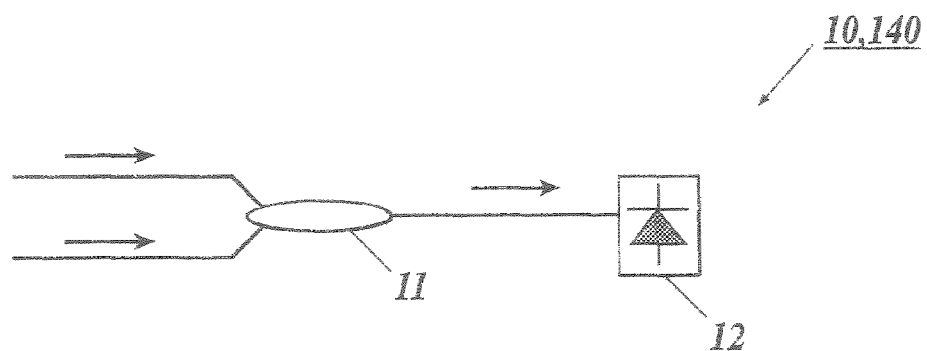
[FIG. 2] This is diagram showing a configuration of each of phase detectors 10 and 140.

FIG. 2 shows the configuration of each of the phase detectors 10 and 140. Each of the phase detectors 10 and 140 is composed of the two elements of a multiplexing unit multiplexing two light signals and a phase comparison unit comparing the phase of the light signal using a nonlinear effect. Each of the phase detectors 10 and 140 is configured to include an optical coupler 11 as the multiplexing unit and a Si-APD 12 as the phase comparison unit. The optical coupler 11 multiplexes the input light signal demultiplexed by the demultiplexer 110 and the beat light signal demultiplexed by the demultiplexer 120 to output the multiplexed light signals. Moreover, the optical coupler 11 is previously set to have the same polarization with a polarization controller so that the polarizations of the two lights after the multiplexing may be the same or is composed of a polarization maintaining optical fiber and a polarization maintaining coupler. The Si-APD 12 is a light receiving unit based on the two-photon absorption as the nonlinear effect, and outputs a phase comparison signal as an output light current corresponding the phased difference between the two light signals before the multiplexing of the light signals multiplexed by the optical coupler 11.

Figure 3:
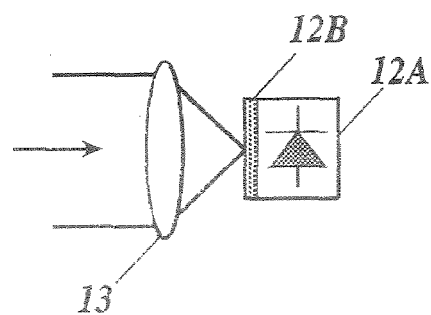
[FIG. 3] This is a diagram showing a configuration of a Si-APD 12.

FIG. 3 shows the configuration of the Si-APD 12. As shown in FIG. 3, the Si-APD 12 is provided with the Si-APD main body 12A, and is configured to be provided with an anti reflection coating (AR coat) 12B formed on a window member as the light receiving surface of the Si-APD main body 12A and the surface thereof. A lens 14 is se so that the focus of an incident light may be adjusted on the light receiving surface of the Si-APD 12A.

A commercially available Si-APD has the maximum sensitivity at 800 nm, and has hardly any sensitivity to the light having a wavelength longer than 1100 nm. Consequently, when the wavelength of an input light signal is 1550 nm, hardly any photoelectric currents are generated by the Si-APD in an ordinary linear process because the energy of the light of 1550 nm is smaller than the band gap of the Si-APD. However, when two-photon absorption occurs in the Si-APD, the sum of the energy of the two photons exceeds the band gap of the Si-APD, and consequently a photoelectric current is generated.

Generally, in order to cause the two-photon absorption more efficiently, an incident light is narrowed down with a lens, and the spot size of the light is made to be the smallest on the light receiving surface of the Si-APD. Accordingly, also as for the present embodiment, in order to make the spot size of an incident light small, it is preferable to narrow down the incident light with the lens 13 having a numerical aperture (NA) as large as possible.

The commercially available Si-APD is provided with the AR coat for making the reflection of the light of 800 nm at which the Si-APD has the maximum light receiving sensitivity, smallest. Consequently, 10% or more of an incident light of 1550 nm different from the optimum wavelength to the AR coat is reflected. The present embodiment uses the light of 1550 nm as an incident light in the optical phase-locked loop apparatus 1 to detect the photoelectric current output by the two-photon absorption phenomenon. Accordingly, it is desirable to provide the AR coat 12B optimum to 1550 nm on the window member and the surface of the Si-APD main body 12A. That is, as the Si-APD 12, the Si-APD composed of the Si-APD main body 12A having the maximum sensitivity at a part shifted from the wavelength of an input light signal and the AR coat 12B that is the optimum at the wavelength of the input light signal and is performed on the Si-APD main body 12A is preferable.

Moreover the Si-APD is able to make the polarization dependence thereof less than that by the other phase comparison units using the other methods and the configuration thereof is simple. Consequently the Si-APD is preferable. Moreover, because the configuration thereof is simple, it is easy to shorten the loop length thereof in the case of using the Si-APD as the phase detector 10 to increase the loop band thereof. Consequently, the Si-APD is preferable also from the standpoint of this respect.

Figure 4A:
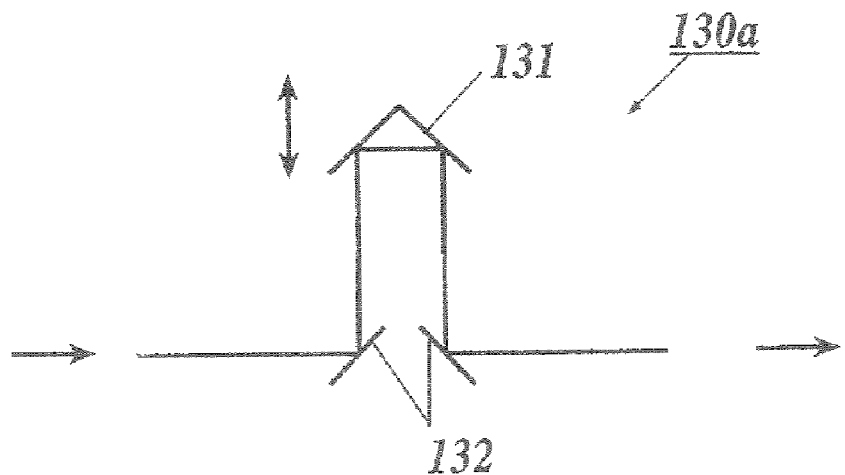
Figure 4B:
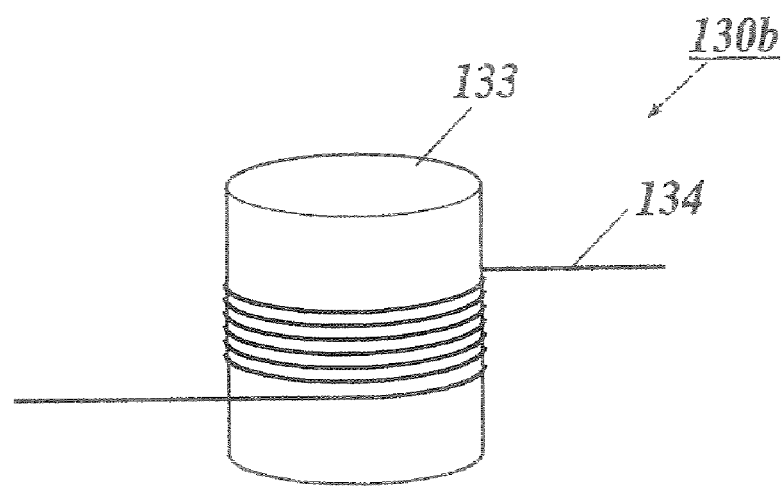
[FIG. 4B] This is a diagram showing a configuration of a variable optical delay unit 130b.

FIGS. 4A and 4B show the examples of the λ/2 shifter 130A using the difference of optical path lengths. FIG. 4A shows the configuration of a variable optical delay unit 130a. FIG. 4B shows the configuration of a variable optical delay unit 130b. It is supposed that the frequencies of the input light signals are fixed in the present embodiment. The λ/2 shifter 130A is composed of the variable optical delay unit 130a or 130b using the difference of optical path lengths. As shown in FIG. 4A, the variable optical delay unit 130a is configured to include mirrors 131 and 132. The variable optical delay unit 130a adjusts the optical path length thereof spatially by installing the mirror 131 with its position adjusted.

FIG. 5 shows each optical path length in the optical phase-locked loop system 1α. As shown in FIG. 5, it is supposed that the optical path length between the output portion of the demultiplexer 110 and the input portion of the phase detector 10 is referred to as a path P1, that the optical path length between the output portion of the demultiplexer 110 and the input portion of the phase detector 140 is referred to as a path P2, that the optical path length between the output portion of the OVCO 30 and the input portion of the phase detector 10 is referred to as a path P3, and that the optical path length between the output portion of the OVCO 30 and the input portion of the phase detector 140 is referred to as a path P4. In this case, the variable optical delay unit 130a is adjusted so as to meet the following formula (1):

$$P1 + P3 = P2 + P4 + (\text{or } -) c/(4 \times f \times n) \qquad (1),$$

where c denotes a light speed, f denotes the frequency of the beat light signal of the OVCO 30, and n denotes the refraction index of the optical path.

By meeting the condition of the formula (1), the phases of the phase detection of the phase detector 10 and the phase detector 140 shift from each other by 90 degrees. Moreover, because the optical path difference is determined by the frequency f, a variable optical delay unit using the optical path difference is able to be used in the case where the frequency of the beat light signal of the OVCO is fixed.

Moreover, the optical phase-locked loop system 1α is installed so that the average output of the phase detector 140 may become the maximum or the minimum by adjusting the optical path length of the path P2 or the path P4 during the operation of the optical phase-locked loop system 1α is confirmed to be normal by the means for measuring the output waveform of the loop filter 20 or the means for measuring the RF spectrum of the beat light signal.

As the variable optical delay unit using the difference between the optical path lengths, the variable optical delay unit 130b shown in FIG. 4B may be used. The variable optical delay unit 130b is provided with a piezoelectric element 133 as a piezoelectric body, and an optical fiber 134 wound around the piezoelectric element 133. The optical path length is adjusted by increasing or decreasing the optical fiber 134, which is increased or decreased by the increasing or the decreasing of the diameter of the piezoelectric element 133 by electrification. Moreover, the variable optical delay unit using the difference between the optical path lengths is able to be also realized by using the planar lightwave circuit or the like besides the method mentioned above.

Figure 6:
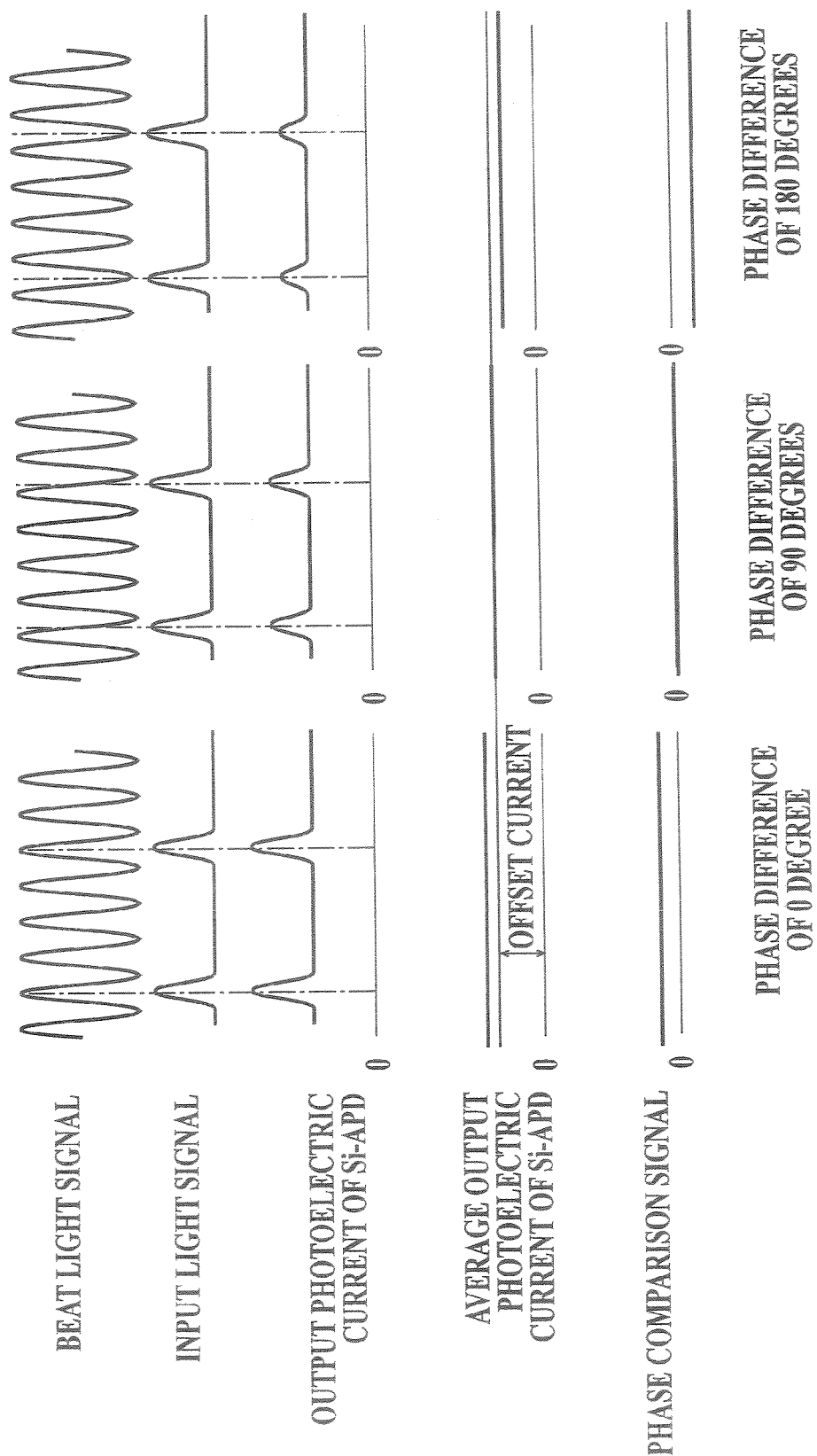
[FIG. 6] This is a diagram showing each signal in the optical phase-locked loop system 1α.
Figure 7:
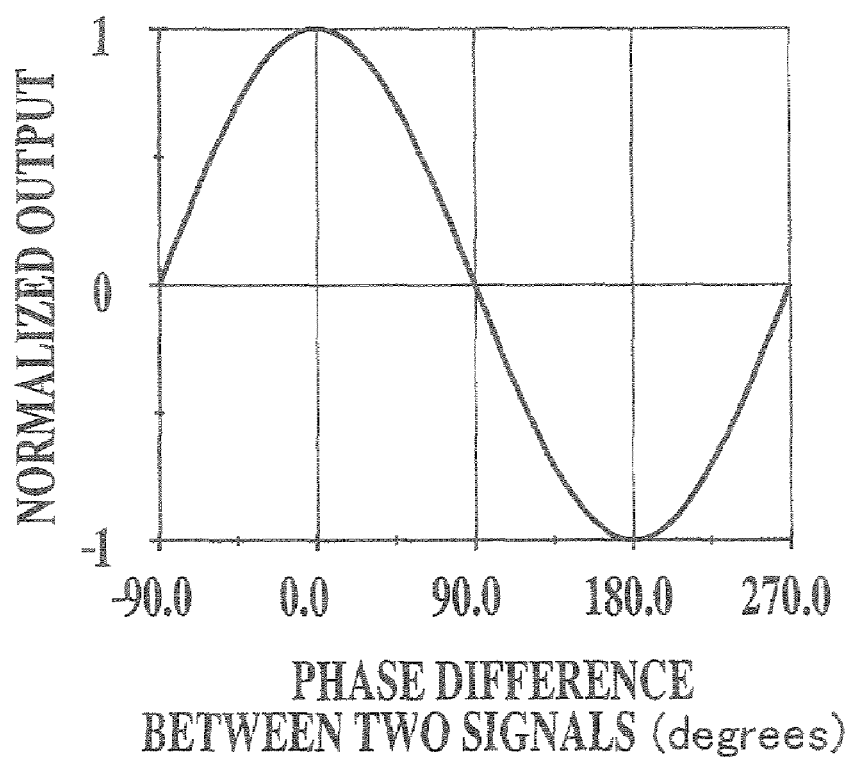
[FIG. 7] This is a diagram showing the normalized outputs to the phase differences between two signals of a beat light signal and an input light signal in the phase detector 140.

Next, the operations of the optical phase-locked loop system 1α are described by using FIGS. 6 and 7. FIG. 6 shows each signal of the optical phase-locked loop system 1α. As shop in n FIG. 6, when the optical phase-locked loop apparatus 1 is normally operating and the phase thereof is synchronized, negative feedback is performed so that the phase comparison signal output from the phase detector 10 may be 0. That is, the phase difference between the beat light signal output from the OVCO 30 (the optical coupler 33 thereof) and the input light signal light output from the demultiplexer 110 is 90 degrees. Moreover, because the OVCO 30 uses the Si-APD as the phase comparator, an output light current is generated as an offset current by the two-photon absorption of the beat light signal itself and the input light signal itself. The phase comparison signal becomes the difference current from the offset current.

When the optical phase-locked loop apparatus 1 is locked, the phase comparison signal is always 0. Moreover, when the optical phase-locked loop apparatus 1 is not locked, the phase comparison signal takes a random value. Consequently, the average value of the phase comparison signal output from the loop filter is 0. Consequently, it is not able to be known that the lock is effective or not based on the average value of the phase comparison signal of the optical phase-locked loop apparatus 1.

FIG. 7 shows the normalized outputs to the phase differences of the two signals of the beat light signal and the input light signal in the phase detector 140. As shown in FIG. 7, when the phase of the beat light signal or the input light signal is shifted by, for example, 90 degrees using the lock detection apparatus 100A and the phase is input into the phase detector 140 installed separately, the average value of the phase comparison signals when the optical phase-locked loop apparatus 1 is locked takes a positive value when the phase difference is 0 degree and a negative value when the phase difference is 180 degrees. Because the output phase signal takes the random value when the optical phase-locked loop apparatus 1 is not locked, the average value becomes 0. Consequently, because the average value of the phase comparison signal differs in compliance with whether the optical phase-locked loop apparatus 1 is operated in the state of being locked or not, it becomes possible to show whether the optical phase-locked loop apparatus 1 is locked or not.

Moreover, when the input light signal and the beat light signal do not synchronize with each other, the average outputs of the phase detector 10 and the phase detector 140 become zero. On the other hand, when the input light signal and the beat light signal synchronize with each other, the OVCO 30 is controlled so that the output of the phase detector 10 becomes zero. At this time, the phases of the input light signal and the beat light signal have the phase difference of $\lambda/2$. At this time, if the phase of the input light signal or the beat light signal is shifted by $\lambda/2$, the phase difference becomes 0 or $\lambda$, and the output of the phase detector 140 becomes not zero.

The output of the phase detector 140 has a value of not zero at the time of being synchronized, and becomes zero as an average at the time of not being synchronized because the output phase is random. Consequently, it becomes possible to perform the synchronize detection. Those situations are shown in the following table 1.

TABLE 1

| | AVERAGE VALUE OF PHASE COMPARISON SIGNALS AT LOCK | AVERAGE VALUE OF PHASE COMPARISON SIGNALS AT UN-LOCK |
| --- | --- | --- |
| PHASE DETECTOR 10 IN LOOP | 0 (CONTROLLED TO BE ALWAYS 0) | 0 (BECAUSE OF TAKING RANDOM VALUES) |
| ADDED PHASE DETECTOR 140 | NOT 0 | 0 (BECAUSE OF TAKING RANDOM VALUES) |

As above, according to the present embodiment, when two signals compared in the phase detector 140 are locked in the $\lambda/2$ shifter 130A, the phase of the beat light signal is shifted by 90 degrees as the quantity by which the phase comparison signal does not become 0, and the phase detector 140 outputs a phase comparison signal (lock detection signal) of the input light signal and the phase-shifted beat light signal. Consequently, the lock of the optical phase-locked loop apparatus 1 is able to be detected based on the phase comparison signal output from the phase detector 140.

Moreover, the $\lambda/2$ shifter 130A is able to shift the phase of the beat light signal using the difference between the optical path lengths.

Each of the phase detectors 10 and 140 is able to output the phase comparison signal with the multiplexing unit and the phase comparison unit. Moreover, because the phase comparison unit is the Si-APD 12, the polarization dependence is able to be reduced, and the apparatus configuration is able to be made to be simple. Moreover, the loop length of the optical phase-locked loop apparatus 1 can be reduced using the Si-APD in the phase detector 10.

Because the AR coat 12B optimum to the wavelength of the input light signal is provided to the Si-APD main body 12A in the Si-APD 12, the efficiency of the incidence into the Si-APD of the light signal corresponding to the wavelength of the input light signal is able to be heightened.

Second Embodiment

A second embodiment according to the present invention is described, referring to FIG. 8. FIG. 8 shows the configuration of an optical phase-locked loop system 1β of the present embodiment. As shown in FIG. 8, the optical phase-locked loop system 1β is configured to include an optical phase-locked loop apparatus 1, which is similar to that of the first embodiment, and a lock detection apparatus 100B.

The lock detection apparatus 100B is configured to include a demultiplexer 110, a demultiplexer 120 and a phase detector 140 similarly to the first embodiment, and further include a $\lambda/2$ shifter 130B. The $\lambda/2$ shifter 130B is similar to the $\lambda/2$ shifter 130A of the first embodiment, but shifts the phase of the input light signal that has been demultiplexed by the demultiplexer 110 by $\lambda/2$. The phase detector 140 compares the phases of the input light signal, the phase of which has been shifted by $\lambda/2$ by the $\lambda/2$ shifter 130A, and the beat light signal demultiplexed by the demultiplexer 120, and outputs a phase comparison signal as a comparison result as a lock detection signal. Consequently, the lock detection apparatus 100B outputs the lock detection signal similar to that of the lock detection apparatus 100A of the first embodiment.

As described above, according to the present embodiment, when the phases of the two light signals that are compared by the phase detector 140 agree with each other in the $\lambda/2$ shifter, the phase of the input light signal is shifted by $\lambda/2$ as the quantity by which the phase comparison signal does not become 0, and the phase detector 140 outputs the phase comparison signal (lock detection signal) of the beat light signal and the phase-shifted input light signal. Consequently, the lock of the optical phase-locked loop apparatus 1 is able to be detected based on the phase comparison signal output from the phase detector 140.

First Modified Example

A first modified example as a modified example of the configurations of the phase detectors 10 and 140 in the first and the second embodiments is described, referring to FIGS. 9A, and 9B-17.

Figure 9A:
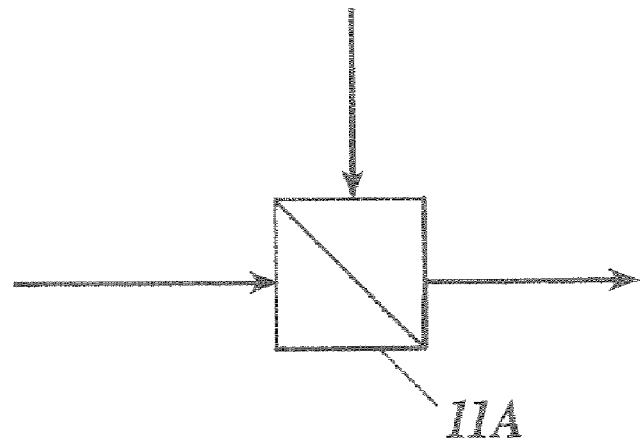
[FIG. 9A] This is a diagram showing the configuration of a beam splitter 11A.
Figure 9B:
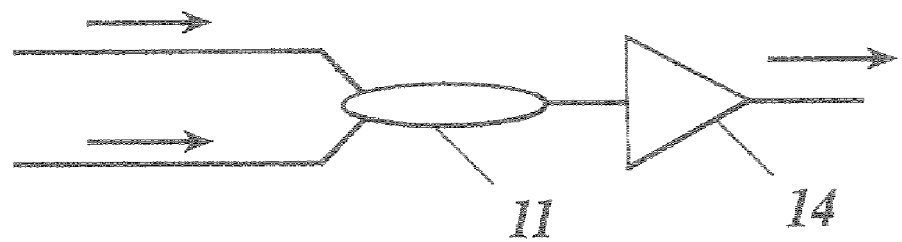
[FIG. 9B] This is a diagram showing an example of installing an optical coupler 11 and an optical amplifier 14.

First, another example of the multiplexing units in the phase detectors 10 and 140 is described, referring to FIGS. 9A and 9B. FIG. 9A shows the configuration of a beam splitter 11A, and FIG. 9B shows an example of installing the optical coupler 11 and the optical amplifier 14. As shown in FIG. 9A, the configuration using the beam splitter 11A as the multiplexing units in the phase detectors 10 and 140 may be adopted. The beam splitter 11A is used in the case where the optical system is constructed of a spatial system. The beam splitter 11A previously set the polarization thereof so that the polarization of the light after multiplexing may be the same.

Moreover, a half-mirror or the like is able to be used as the multiplexing unit in each of the phase detectors 10 and 140 in place of the beam splitter 11A.

As shown in FIG. 9B, the configuration of installing the optical amplifier 14 at the subsequent stage of the multiplexing unit (the optical coupler 11 in the drawing) in each of the phase detectors 10 and 140 may be adopted. The light signal after the multiplexing by the multiplexing unit in each of the phase detectors 10 and 140 is input into the Si-APD 12 as the phase comparison unit. The light signal is previously amplified by the optical amplifier 14 in order to cause the nonlinear effect more strongly.

Figure 10A:
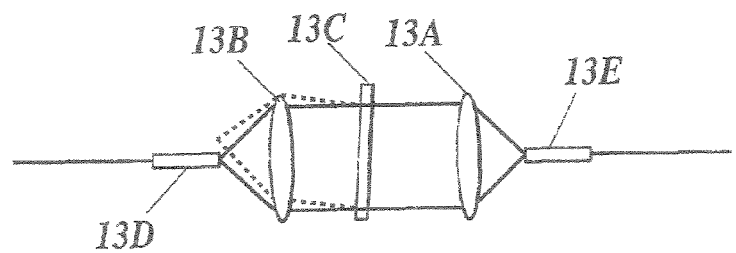
[FIG. 10A] This is diagram showing a configuration of an incident light and a reflected light when an optical element is inclined.
Figure 10B:
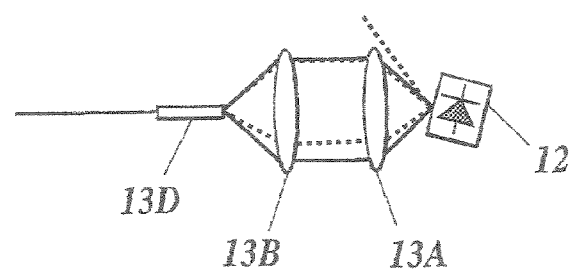
[FIG. 10B] This is a diagram showing the loci of an incident light and a reflected light when the Si-APD is inclined.

Next, another example of the phase comparison unit in each of the phase detectors 10 and 140 is described, referring to FIGS. 10A, and 10B-17. FIG. 10A shows the configuration of an incident light and a reflected light when an optical element is inclined FIG. 10B shows the locus of an incident light and a reflected light when the Si-APD is inclined. In FIGS. 10A and 10B, the incident light is shown by a solid line, and the reflected light (return light) is shown by a dotted line.

Even if the AR coat 12B optimum to the incident wavelength is formed on the S-APD main body 12A like the Si-ADD 12 of the first embodiment, a reflected light arises. Accordingly, it is needed to prevent the reflected light from returning to the preceding stage. The optical system shown in FIG. 10A is used in an optical module such as an optical isolator and an optical filter. As shown in FIG. 10A, a light flux emitted from an exit end 13D is collimated by a lens 13B to pass through an optical element 13C, and is condensed by a lens 13A to be input into an input end 13E. Because the optical element 13C is installed obliquely to (the optical axis of) the collimated light, the focus of the reflected light is spatially shifted from the incident point. Consequently, the return quantity of the reflected light to the preceding stage of the optical module 13C generally becomes −50 dB or less of the incident light power.

The larger the power density of an incident light is, the more efficiently the two-photon absorption phenomenon occurs. Accordingly, the configuration of overlapping the focus of the lens 13A on the Si-APD 12 and of installing the Si-APD 12 in the state of being obliquely inclined as shown in FIG. 10B in order to heighten the luminance thereof is considered. Because the NA value of the lens 13A is large and the reflected light spatially agrees with the incident end even if the Si-APD 12 is obliquely inclined, it is more difficult to make the return quantity of the reflected light to the preceding stage small in comparison with the configuration of the optical arrangement of FIG. 10A. If the reflected light is reflected by the optical components and the like at the preceding stage of the Si-APD 12 to enter the Si-APD 12 again, the reflected light interferes with the light directly entering the Si-APD 12 to cause the wavelength dependence in the efficiency of the occurrence of the two-photon absorption.

Figure 11:
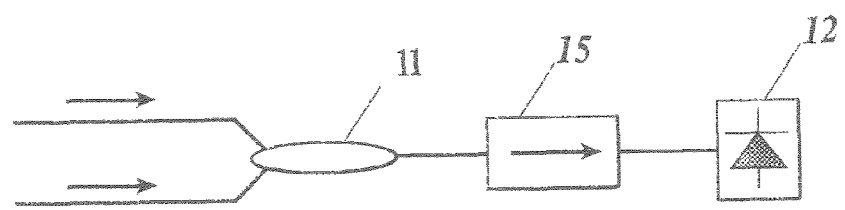
[FIG. 11] This is a diagram showing a configuration provided with an optical isolator 15 in a phase detector.

FIG. 11 shows the configuration of being provided with an optical isolator 15 in a phase detector. The wavelength dependence of the efficiency of the occurrence of the two-photon absorption mentioned above is moderated by the configuration of interposing the optical isolator 15 between the optical coupler 11 and the Si-APP 12 in each of the phase detectors 10 and 140 as shown in FIG. 11. The configuration of interposing an optical circulator or the like in place of the optical isolator 15 may be adopted. Moreover, the configuration of interposing the optical isolator or the like at the preceding stage of the phase comparison unit of each of the other configurations mentioned below may be adopted, and such a configuration is effective in a phase comparison unit performing condensing using a lens such as a PMT and an SHG crystal.

Figure 12:
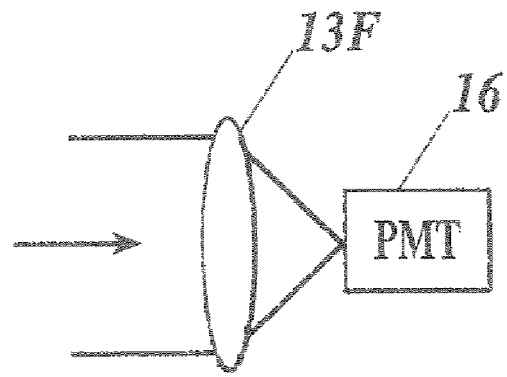
[FIG. 12] This is a diagram showing a configuration provided with a PMT 16 in a phase detector.

FIG. 12 shows the configuration provided with a PMT 16 in a phase detector. There is a PMT as an element of outputting an electric signal according to the phase difference of incident lights using the two-photon absorption besides the Si-APD. As shown in FIG. 12, a lens 13F and the PMT 16 as a phase comparison unit are installed in the order in each of the phase detectors 10 and 140. The PMT (photomultiplier tube) is a device using the two-photon absorption to convert the light signal of a very weak scintillation pulse into an electric signal corresponding to the scintillation pulse. The two-photon absorption of the PMT 16 is made to efficiently occur by condensing a light onto the photoelectric surface of the PMT 16 with the lens 13F. As the PMT 16, the PMT that has hardly any sensitivity in the infrared, and has high sensitivity at 800 nm is used.

The configuration using the PMT in the phase comparison unit is able to heighten the light receiving sensitivity than the configuration using the Si-APP 12 by about single-digit. Moreover, the configuration using the other phase comparison units comparing the phase of incident lights using the two-photon absorption may be adopted.

Figure 13:
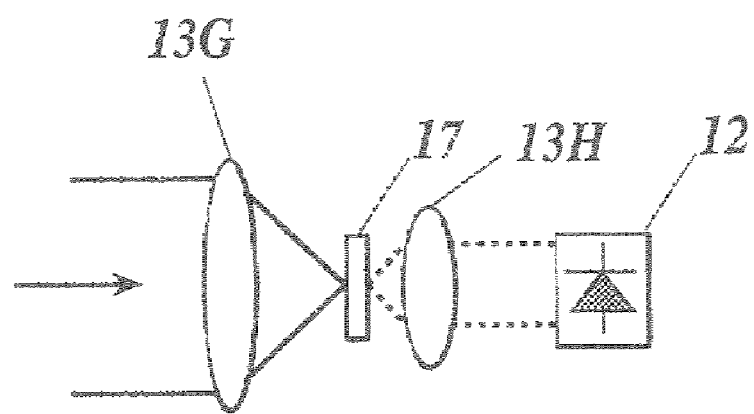
[FIG. 13] This is a diagram showing a configuration provided with an SHG crystal 17 in a phase detector.

FIG. 13 shows the configuration provided with a second harmonic wave generation (SHG) crystal 17 in a phase detector. As the phase comparison unit, the one using second harmonic wave generation, which emits an outgoing light having the double oscillation frequency of that of an incident light when the incident light enters the surface thereof, may be used besides the elements performing the two-photon absorption. As shown in FIG. 13, a lens 13G, an SHG crystal 17 and a lens 13H are installed in the order at the preceding stage of the Si-APD 12 in each of the phase detectors 10 and 140. The SHG crystal 17 is a crystal generating a second harmonic wave, and, for example, $LiNbO_3$. The lens 13G is used so that an input light enters the SHG crystal 17 in the state of being a beam diameter as small as possible for the more efficient generation of the SHG in the SHG crystal 17. As the Si-APD 12, the one that hardly has sensitivity to the incident light but has high sensitivity to a generated SH light may be used as the light receiving unit. Moreover, an optical filter or a color filter that attenuates an incident light and transmits only the generated SH light may be installed at the preceding stage of the Si-APD 12. In this configuration, a light receiving unit such as a PD may be used in place of the Si-APD 12.

The configuration using the SHG crystal in the phase comparison unit is able to be constructed as the configuration of outputting an electric current when the longitudinal polarization and the transverse polarization of an incident light has a correlation with each other, and is able to realize the configuration of having no offset currents in a phase comparison signal.

Figure 14:
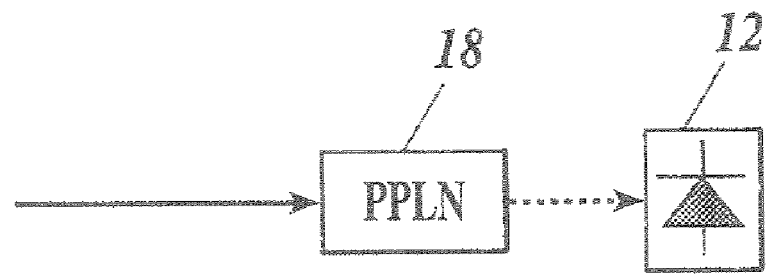
[FIG. 14] This is a diagram showing a configuration provided with a PPLN 18 in a phase detector.

FIG. 14 shows the configuration provided with a PPLN 18 in a phase detector. As shown in FIG. 14, the PPLN 18 as the phase comparison unit using the second harmonic wave generation is installed at the preceding stage of the Si-APD 12 in each of the phase detectors 10 and 140. The PPLN 18 is an efficient wavelength conversion element (periodical poled $LiNbO_3$ crystal) having achieved quasi phase matching (QPM) by forming a periodical poled structure in $LiNbO_3$. The PPLN 18 operates similarly to the SHG crystal 17. In the configuration, a light receiving unit such as a PD may be used in place of the Si-APD 12. Moreover, the configuration using another phase comparison unit comparing the phases of incident lights using the second harmonic wave generation may be adopted.

The configuration using the PPLN as the phase comparison unit is able to use an optical fiber as an optical waveguide in the case of using a waveguide PPLN, and is able to simplify its configuration in comparison with the configuration using the SHG crystal. Moreover, the configuration using another phase comparison unit comparing the phases of the incident lights using the second harmonic wave generation may be adopted.

Figure 15:
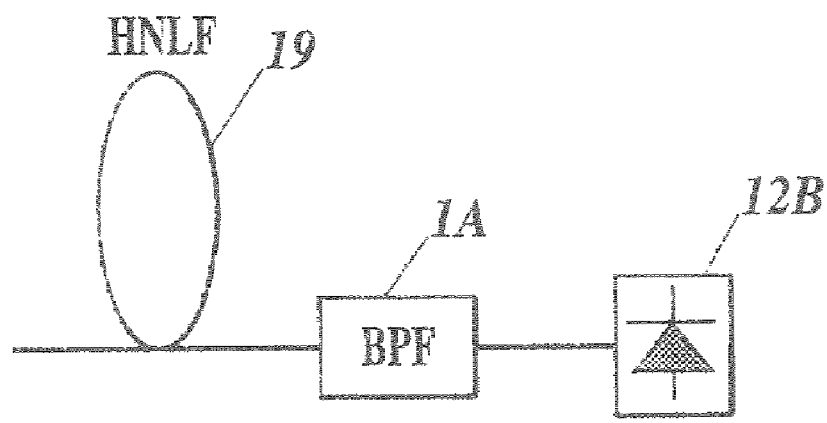
[FIG. 15] This is a diagram showing a configuration provided with an HNLF 19 in a phase detector.

FIG. 15 shows the configuration provided with a highly nonlinear fiber (HNLF) 19 in a phase detector. As the phase comparison unit, the one using four-wave mixing emitting two photons of wavelengths different from those of incident lights by the incidence of two photons having mutually different wavelengths may be used. As shown in FIG. 15, a HNLF 19 using the four-wave mixing and a band pass filter (BPF) 1A are installed in the order at the preceding stage of the Si-APD 12 in each of the phase detectors 10 and 140. An incident light enters the HNLF 19, and an outgoing light, which has been generated by the four-wave mixing from the incident light and has a new wavelength different from that of the incident light, transmits the BPF 1A to be converted to an electric signal in the Si-APD 12. In the configurations a light receiving unit such as a PD ray be used in place of the Si-APD 12.

Because the configuration using the HNLF as the phase comparison unit uses the four-wave mixing, the configuration in which no offset currents are generated in a phase comparison signal is able to be realized. Moreover, as another phase comparison unit using the four-wave mixing to compare the phases of incident lights, the configuration using an SOA or the like may be adopted. Moreover, the configuration using a NOLM or the like using the Kerr effect as the phase comparison unit may be adopted.

According to the present modified example, when the optical isolator 15 is installed at the preceding stage of the Si-APD 12 as the phase comparison unit of each of the phase detectors 10 and 140, the return light of a light signal entering the Si-APD 12 is able to be reduced, and the wavelength dependence of the efficiency of the occurrence of the two-photon absorption is able to be reduced. Moreover, in the case of using the PMT 16 as the phase comparison unit, the sensitivity of the light signal entering the phase comparison unit is able to be heightened.

Moreover, if the phase comparison nit is provided with the SHG crystal 17 and the Si-APD 12 as the light receiving unit thereof, a phase comparison signal having no offset currents is able to be output. Moreover, if the phase comparison unit is provided with the PPLN 18 and the Si-APD 12 as the light receiving unit thereof, the apparatus configuration is able to be simplified, and the phase comparison signal having no offset currents is able to be output. Moreover, if the phase comparison unit is provided with the HNLF 19, and the BPF 1A and Si-APD 12, both as the light receiving units receiving the light of a newly generated wavelength to output a phase comparison signal, a phase comparison signal having no offset currents can be output.

Second Modified Example

A second modified example to the first embodiment and the first modified example mentioned above is described, by referring to FIGS. 16 and 17. Although each of the embodiments (and the first modified example) has the configuration shifting the phase of a light signal by $\lambda/2$ by changing the optical path length thereof as each of the $\lambda/2$ shifters 130A and 130B, the configuration of shifting the phase of a light signal by $\lambda/2$ using a wavelength plate is describe in the present modified example. The relation of P1+P3=P2+P4 is satisfied in FIG. 5, it is possible to cause an effective optical path difference in a light signal using a wavelength plate and a polarization beam splitter (PBS). Moreover, even if the frequency of an input light signal is made to be variable, the configuration using the wavelength plate and the PBS operates without any adjustments.

Figure 16:
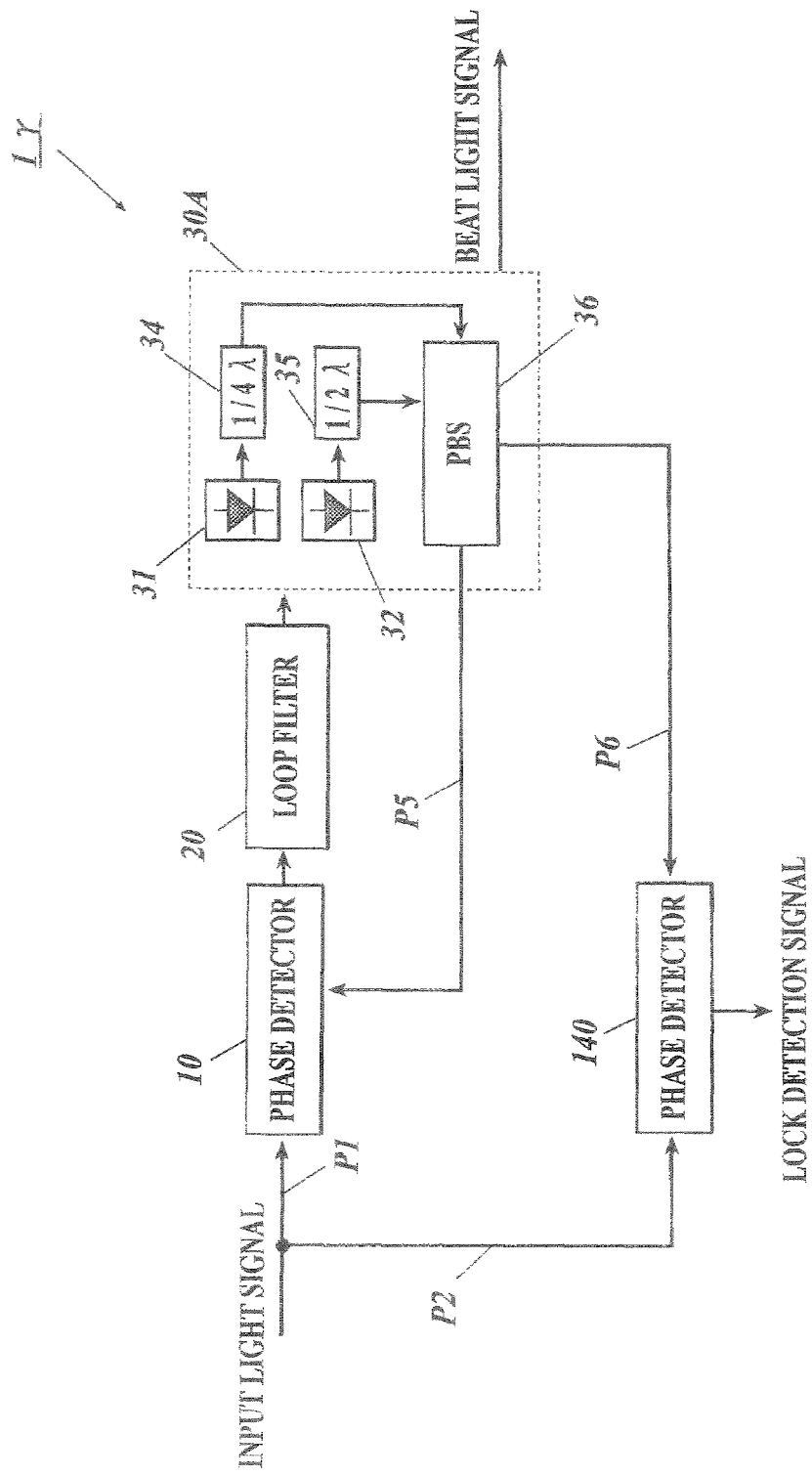
[FIG. 16] This is a diagram showing a configuration of an optical phase-locked loop system 1γ.

FIG. 16 shows the configuration of an optical phase-locked loop system 1γ. The optical phase-locked loop system 1γ is a modified example of the optical phase-locked loop system 1α of the first embodiment, and is provided with an OVCO 30A in place of the demultiplexer 120, the $\lambda/2$ shifter 130A and the OVCO 30.

The OVCO 30A is provided with the LD's 31 and 32, a $\lambda/4$ wavelength plate 34, a $\lambda/2$ wavelength plate 35 and a PBS 36. Light signals having mutually different frequencies are output from the LD's 31 and 32 accordingly to the formed phase comparison signal output from the loop filter 20; the light output from the LD 31 transmits the $\lambda/4$ wavelength plate 34 to be input into the PBS 36; and the light output from the LD 32 transmits the $\lambda/2$ wavelength plate 35 to be input into the PBS 36. Moreover, as shown in FIG. 16, it is supposed that the optical path length between the output portion of the PBS 36 and the input portion of the phase detector 10 is referred to as a path P5, and that the optical path length between the output portion of the PBS 36 and the input portion of the phase detector 140 is referred to as a path P6.

Figure 17:
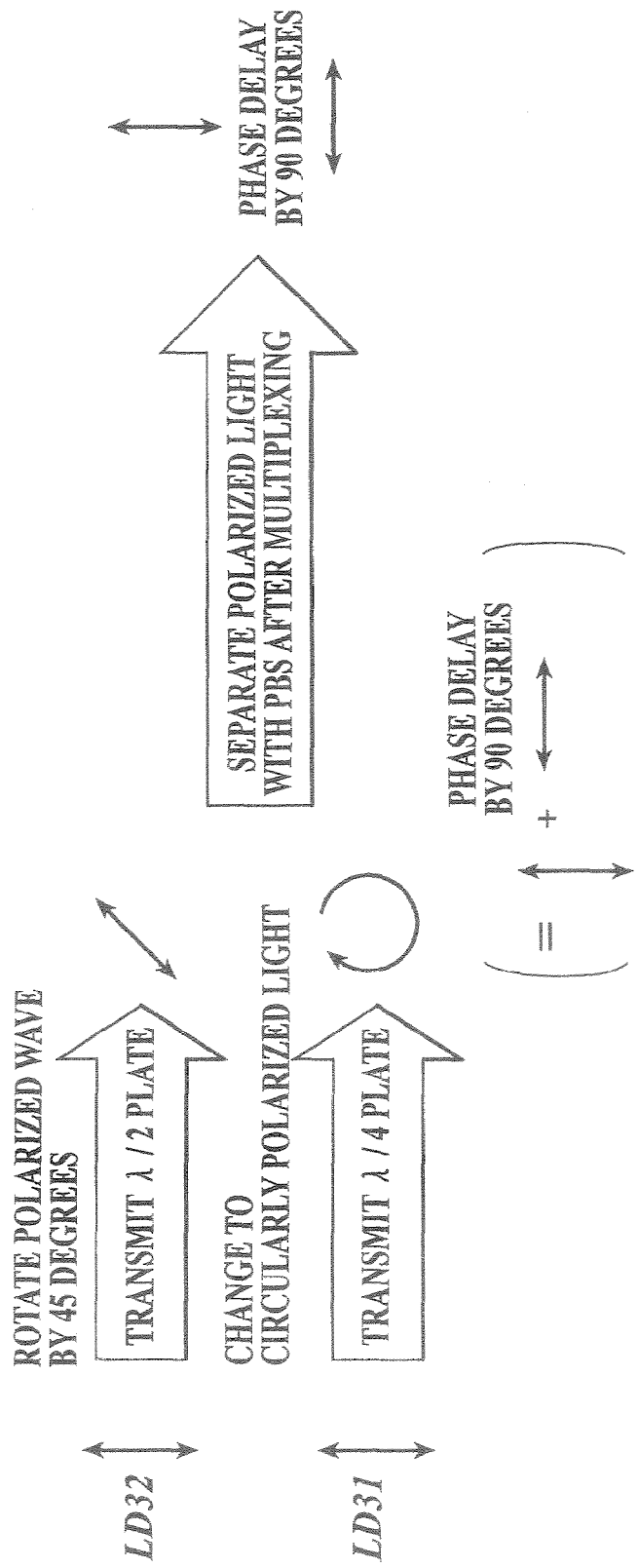
[FIG. 17] This is a diagram showing state changes of light signals in an OVCO 30A.
Figure 18:
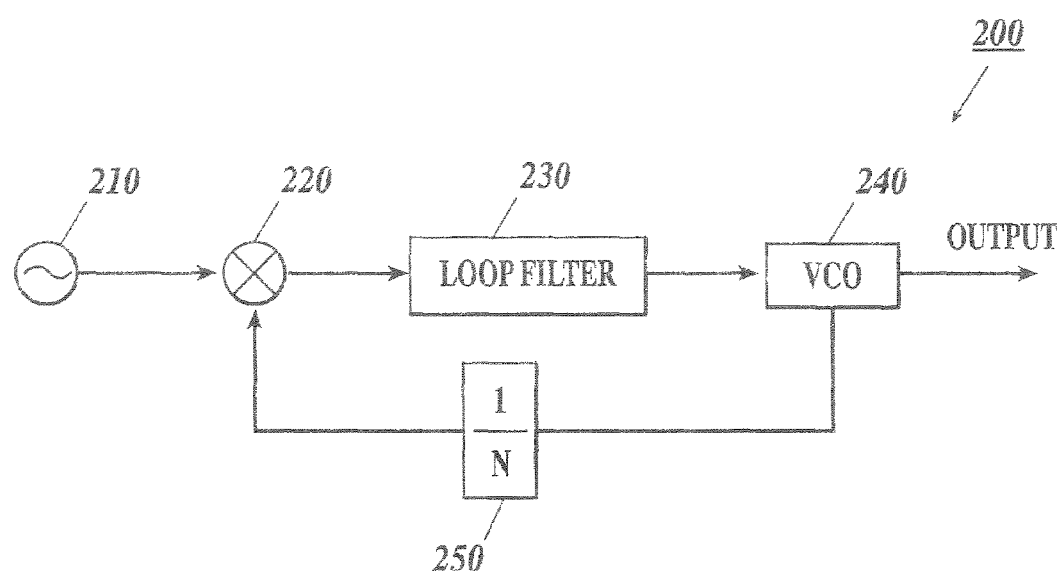
[FIG. 18] This is a diagram showing a configuration of a phase-locked loop apparatus 200.
Figure 19:
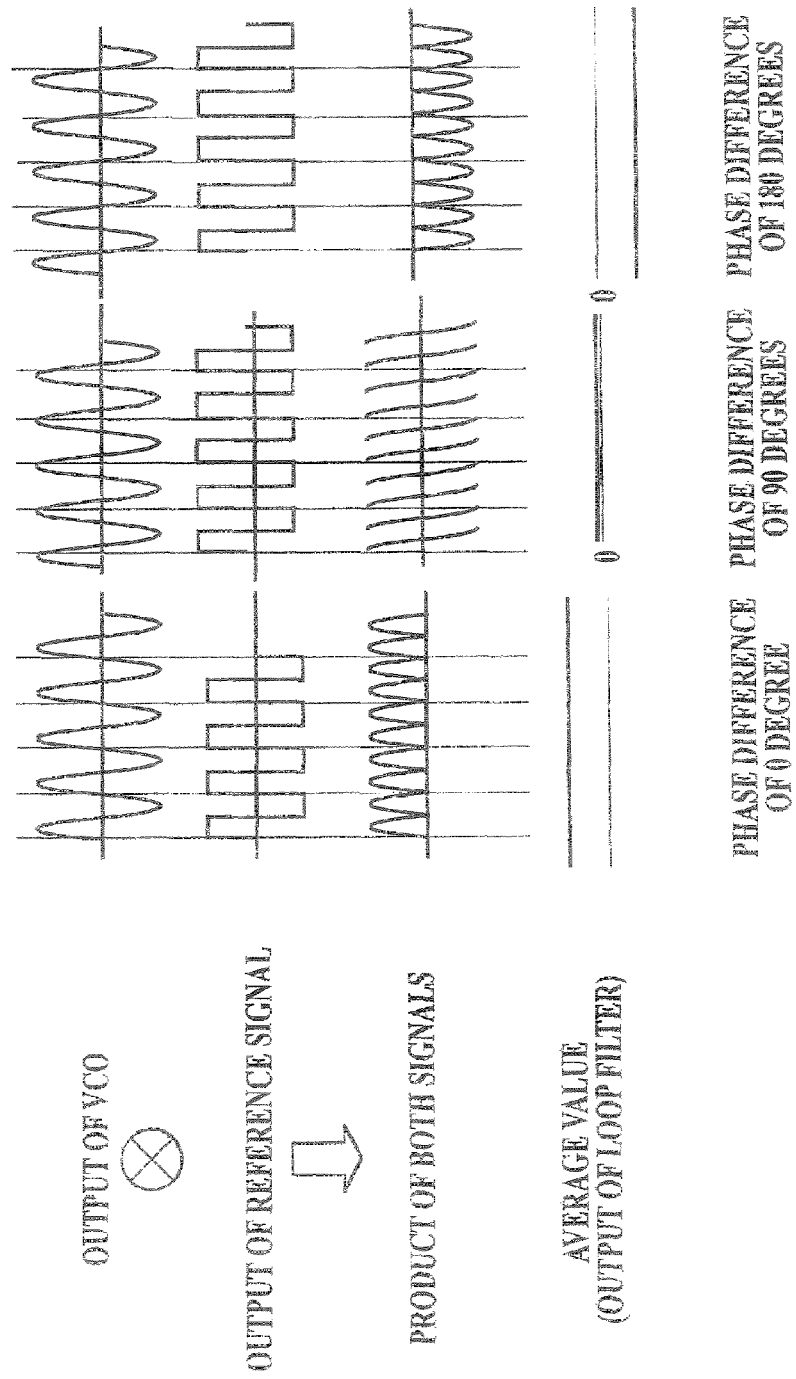
[FIG. 19] This is waveform diagrams showing the operations of an electric mixer 220.
Figure 20:
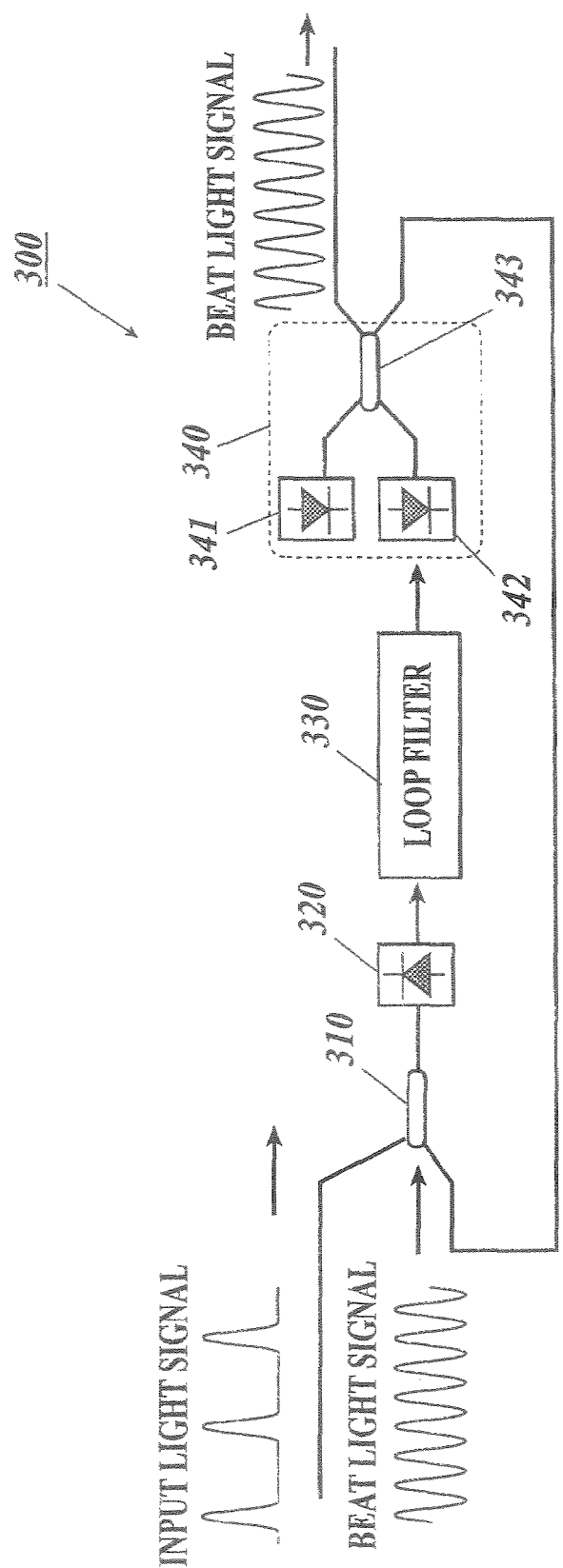
[FIG. 20] This is a diagram showing a configuration of an optical phase-locked loop apparatus 300.

FIG. 17 shows the state changes of light signals in the OVCO 30A. As shown in FIG. 17, it is supposed that each light signal output from the LD's 31 and 32 is a linearly polarized wave (longitudinal polarization) having a mutually different frequency. The direction of the input polarization of the light signal output from the LD 31 and the direction of the $\lambda/4$ wavelength plate 34 are adjusted so that the polarization plane of the light signal output from the LD 31 may be rotated by 45 degrees by the $\lambda/4$ wavelength plate 34 with the light signal being the linearly polarized wave. Moreover, the direction of the input polarization of the light signal output from the LD 32 and the direction of the $\lambda/2$ wavelength plate 35 are adjusted so that the light signal output from the LD 32 may be converted into a circularly polarized light by the $\lambda/2$ wavelength plate 35. The circularly polarized light is the sum of the longitudinal polarization component and the transverse polarization component having a phase being delayed by 90 degrees. Moreover, a beat light signal is output from the PBS 36 to the path P5 or P6 as an output.

Then, the light signal having the polarization plane rotated by 45 degrees and the light signal of the circularly polarized light are input into the PBS 36, and are multiplexed to be converted into a beat light signal there. Furthermore, the beat light signal is separated into the longitudinal polarization component and the transverse polarization component of the beat light signal having the phase delayed by 90 degrees. Because the phase difference between the phase of the longitudinal polarization component of the beat light signal and the phase of the transverse polarization component of the beat light signal having the phase delayed by 90 degrees is 90 degrees even if the longitudinal polarization component and the transverse component are distributed in order to the paths P5 and P6, respectively, a $\lambda/2$ shifter is realized.

According to the present modified example, in the OVCO 30A, the light signal having transmitted the $\lambda/2$ wavelength plate 35 and the light signal having transmitted the $\lambda/4$ wavelength plate 34 are multiplexed by the PBS 36, and the multiplexed light signal is separated to the beat light signal and the beat light signal having the phase shifted by 90 degrees. Then, the phase detector 10 outputs the phase comparison signal of the input light signal and one beat light signal, and the phase detector 140 is able to output the phase comparison signal of the input light signal and the beat light signal having the phase shifted by 90 degrees from the phase of the beat light signal input into the phase detector 10. Consequently, the lock of the optical phase-locked loop apparatus 1 is able to be detected based on the phase comparison signal of the phase detector 140 regardless of the changes of the frequency of the input light signal, and the one beat light signal and the other beat light signal having the phase shifted by 90 degrees are able to be easily output.

Incidentally, although the configurations of the phase detector 10 and 140 have been described in each of the embodiments and the modified examples, any of the configurations may be the one of at least one of the phase detectors 10 and 140. Moreover, each of the phase shifters 130A and 130B in each of the embodiments and the first modified example may have the configuration performing the phase shift by the quantity by which a phase comparison signal does not become 0 when the phases of the two light signals compared in the phase detector 140 synchronize with each other to the beat light signal or the incident light signal. Moreover, in the second modified example, the wavelength plate as a phase shifter may have the configuration of adjusting the quantity by which the phase comparison signal does not become 0 when the phases of the two light signals compared in the phase detector 140 synchronize with each other to the light signals output from the LD's 31 and 32.

Moreover, it is a matter of course that the configurational details and the operational details of each configuration element of the optical phase-locked loop system in each of the embodiments and the modified examples are able to be suitably changed without departing from the sprit of the present invention.

INDUSTRIAL APPLICABILITY

As described above, the lock detection apparatus and the optical phase-locked loop system according to the present invention is suitable for being applied to an optical phase-locked loop apparatus outputting a beat light signal synchronized with an input light signal.

The invention claimed is:

1. A lock detection apparatus detecting lock of an optical phase-locked loop apparatus including a first phase detector comparing phases of an input light signal and a beat light signal to output a first phase comparison signal, a loop filter forming the first phase comparison signal, and an optical voltage controlled oscillator outputting the beat light signal based on the formed first phase comparison signal, the lock detection apparatus comprising:
a phase shifter shifting the phase of the beat light signal; and
a second phase detector comparing the phases of the input light signal and the phase-shifted beat light signal to output a second phase comparison signal,
wherein the phase shifter shifts a quantity of the phase to the beat light signal so that the second phase comparison signal does not become 0 when the phases of the two light signals compared by the second phase detector synchronize with each other.

2. The lock detection apparatus according to claim 1, wherein the phase shifter shifts the phase of the beat light signal based on a difference of optical path lengths.

3. The lock detection apparatus according to claim 1, wherein at least one of the first and the second phase detectors includes a multiplexing unit multiplexing the input light signal and the beat light signal, and a phase comparison unit outputting a phase comparison signal according to a phase difference between the input light signal and the beat light signal by a nonlinear effect using the multiplexed light signal.

4. The lock detection apparatus according to claim 3, wherein the phase comparison unit is a Si-APD.

5. The lock detection apparatus according to claim 4, wherein the Si-APD is provided with an antireflective film corresponding to a wavelength of the input light signal.

6. The lock detection apparatus according to claim 3, further comprising an optical isolator at a preceding stage of the phase comparison unit.

7. The lock detection apparatus according to claim 3, wherein the phase comparison unit is a photomultiplier tube.

8. The lock detection apparatus according to claim 3, wherein the phase comparison unit includes a second harmonic wave generation crystal, and a light receiving unit receiving a light output from the second harmonic wave generation crystal to output a phase comparison signal.

9. The lock detection apparatus according to claim 3, wherein the phase comparison unit includes a periodical poled LiNbO$_3$ crystal, and a light receiving unit receiving a light output from the periodical poled LiNbO$_3$ crystal to output a phase comparison signal.

10. The lock detection apparatus according to claim 3 wherein the phase comparison unit includes a highly nonlinear fiber, and a light receiving unit receiving a light newly produced from the highly nonlinear fiber to output a phase comparison signal.

11. A lock detection apparatus detecting lock of an optical phase-locked loop apparatus including a first phase detector comparing phases of an input light signal and a beat light signal to output a first phase comparison signal, a loop filter forming the first phase comparison signal, and an optical voltage controlled oscillator outputting the beat light signal based on the formed first phase comparison signal, the lock detection apparatus comprising:
a phase shifter shifting the phase of the input light signal; and
a second phase detector comparing the phases of the beat light signal and the phase-shifted input light signal to output a second phase comparison signal, wherein
the phase shifter shifts a quantity of the phase so that the second phase comparison signal may not be 0 when the phases of the two light signals compared by the second phase detector synchronize with each other to the input light signal.

12. The lock detection apparatus according to claim 11, wherein the phase shifter shifts the phase of the input light signal based on a difference of optical path lengths.

13. The lock detection apparatus according to claim 11, wherein at least one of the first and the second phase detectors includes a multiplexing unit multiplexing the input light signal and the beat light signal, and a phase comparison unit outputting a phase comparison signal according to a phase difference between the input light signal and the beat light signal by a nonlinear effect using the multiplexed light signal.

14. The lock detection apparatus according to claim 13, wherein the phase comparison unit is a Si-APD.

15. The lock detection apparatus according to claim 14, wherein the Si-APD is provided with an antireflective film corresponding to a wavelength of the input light signal.

16. The lock detection apparatus according to claim 13, further comprising an optical isolator at a preceding stage of the phase comparison unit.

17. The lock detection apparatus according to claim 13, wherein the phase comparison unit is a photomultiplier tube.

18. The lock detection apparatus according to claim 13, wherein the phase comparison unit includes a second harmonic wave generation crystal, and a light receiving unit receiving a light output from the second harmonic wave generation crystal to output a phase comparison signal.

19. The lock detection apparatus according to claim 13, wherein the phase comparison unit includes a periodical poled LiNbO$_3$ crystal, and a light receiving unit receiving a light output from the periodical poled LiNbO$_3$ crystal to output a phase comparison signal.

20. The lock detection apparatus according to claim 13 wherein the phase comparison unit includes a highly nonlinear fiber, and a light receiving unit receiving a light newly produced from the highly nonlinear fiber to output a phase comparison signal.

21. An optical phase-locked loop system comprising:
the lock detection apparatus according to claim 1, and
the optical phase-locked loop apparatus.

22. An optical phase-locked loop system comprising:
the lock detection apparatus according to claim 11, and
the optical phase-locked loop apparatus.

23. An optical phase-locked loop system comprising:
an optical phase-locked loop apparatus including a first phase detector comparing phases of an input light signal and a beat light signal to output a first phase comparison signal, a loop filter forming the first phase comparison signal, and an optical voltage controlled oscillator outputting the beat light signal based on the formed first phase comparison signal, wherein the optical voltage controlled oscillator includes:

a first and a second light sources each outputting a light signal having a mutually different frequency;

a phase shifter adjusting the light signals output from the first and the second light sources by a wavelength plate to shift a phase of a light beat signal output from the optical voltage controlled oscillator; and a beam splitter multiplexing the adjusted light signals to separate the multiplexed light signal into a first and a second beam light signals, wherein the first phase detector compares phases of the input light signal and a first beat light signal to output the first phase comparison signal, and a second phase detector comparing phases of the input light signal and a second beat light signal to output a second phase comparison signal, wherein the phase shifter adjusts a quantity to the two light signals output from the first and the second light sources so that the second phase comparison signal does not become 0 when the phases of the two light signals compared by the second phase detector synchronize with each other.

24. The optical phase-locked loop system according to claim 23, wherein the phase shifter includes a $\lambda/2$ wavelength plate through which an output signal of the first light source transmits, and a $\lambda/4$ wavelength plate through which an output signal of the second light source transmits; and the beam splitter multiplexes a light signal transmitted through the $\lambda/2$ wavelength plate and a light signal transmitted through the $\lambda/4$ wavelength plate, and separates the multiplexed light signal into a first beat light signal and a second beat light signal having a phase shifted from the first beat light signal by 90 degrees.

25. The optical phase-locked loop system according to claim 23, wherein at least one of the first and the second phase detectors comprises:

a multiplexing unit multiplexing the input light signal and the beat light signal; and a phase comparison unit outputting a phase comparison signal corresponding to a phase difference between the input light signal and the beat light signal according to a nonlinear effect by using the multiplexed light signal.

26. The optical phase-locked loop system according to claim 25, wherein the phase comparison unit is a Si-APD.

27. The optical phase-locked loop according to claim 26, wherein the Si-APD is provided with an antireflective film according to a wavelength of the input light signal.

28. The optical phase-locked loop system according to claim 25, further comprising an optical isolator at a preceding stage of the phase comparison unit.

29. The optical phase-locked loop system according to claim 25, wherein the phase comparison unit is a photomultiplier tube.

30. The optical phase-locked loop system according to claim 25, wherein the phase comparison unit comprises a second harmonic wave generation crystal, and a light receiving unit receiving a light output from the second harmonic wave generation crystal to output a phase comparison signal.

31. The optical phase-locked loop system according to claim 25, wherein the phase comparison unit comprises a periodical poled $LiNbO_3$ crystal, and a light receiving unit receiving a light output from the periodical poled $LiNbO_3$ crystal to output a phase comparison signal.

32. The optical phase-locked loop system according to claim 25, wherein the phase comparison unit comprises a highly nonlinear fiber, and a light receiving unit receiving a light of a newly produced wavelength from the highly nonlinear fiber to output a phase comparison on signal.

* * * * *